Figure 1:
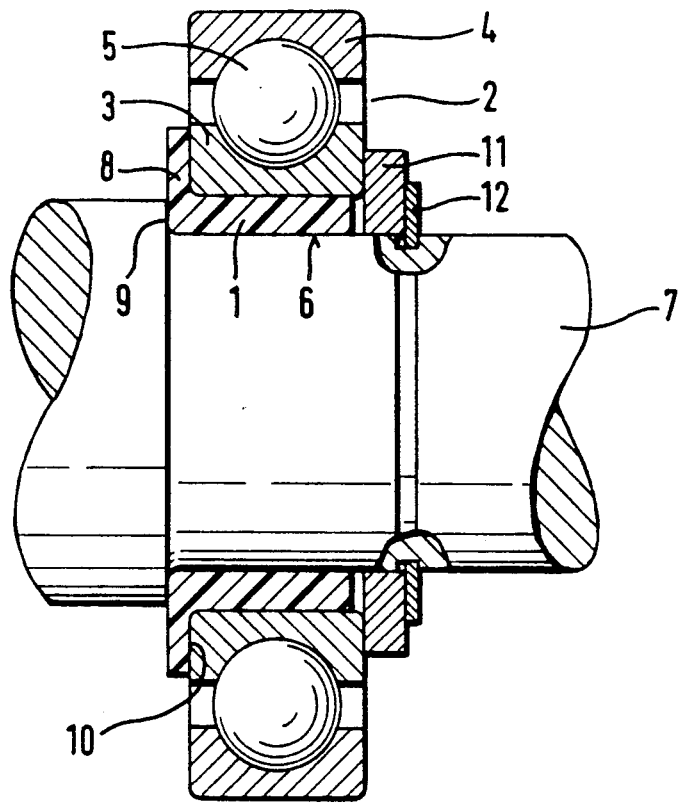

United States Patent [19]

Adler et al.

[11] Patent Number: 5,125,755
[45] Date of Patent: Jun. 30, 1992

[54] POLYMERIC TOLERANCE RING

[75] Inventors: Hellmut Adler; Alexander Zernickel, both of Herzogenaurach, Fed. Rep. of Germany

[73] Assignee: INA Walzlager Schaeffler KG, Fed. Rep. of Germany

[21] Appl. No.: 822,652

[22] Filed: Jan. 21, 1992

Related U.S. Application Data

[63] Continuation of Ser. No. 568,824, Aug. 17, 1990, abandoned.

Foreign Application Priority Data

Sep. 16, 1989 [DE] Fed. Rep. of Germany ....... 3930970

[51] Int. Cl.$^5$ ............................................. F16C 27/04
[52] U.S. Cl. .................................... 384/536; 384/537; 384/624
[58] Field of Search ............... 384/536, 624, 582, 537, 384/585

[56] References Cited

U.S. PATENT DOCUMENTS 4,668,110 5/1987 Egeto et al. ........................ 384/536
4,708,499 11/1987 Löser et al. ........................ 384/536

Primary Examiner—Lenard A. Footland
Attorney, Agent, or Firm—Bierman and Muserlian

[57] ABSTRACT

A tolerance ring made of polymeric material arranged between a radial rolling bearing and a seating on a shaft or in the bore of a housing, wherein the tolerance ring bears against a radially directed surface of the seating on the shaft or housing bore in at least one axial direction and comprises a radially directed surface against which a bearing ring of the rolling bearing bears in the same axial direction with an end face, characterized in that the radially directed surface of the seating and the end face of the bearing ring do not overlap radially which avoids axial overloading.

3 Claims, 1 Drawing Sheet

POLYMERIC TOLERANCE RING

PRIOR APPLICATION

This application is a continuation of U.S. patent application Ser. No. 568,824, filed Aug. 17, 1990, now abandoned.

STATE OF THE ART

Tolerance rings made of polymeric material arranged between a radial rolling bearing and a seating on a shaft or in the bore of housing, wherein on the one hand the tolerance ring bears against a radially directed surface of the seating on the shaft or housing bore in at least one axial direction and on the other hand comprises a radially directed surface against which a bearing ring of the rolling bearing bears in the same axial direction with an end face are used as a rule when rolling bearings have to be fixed on shafts with rough tolerances. It is, however, not possible here to limit the retaining force of the rolling bearing to a defined value and this is required when such a rolling bearing has to be displaced in the axial direction from its fixed position at a predetermined axial overload level without destruction to avoid larger damages.

DE-PS 746,892 describes a rolling bearing fixed with the help of a tolerance ring on a shaft which bearing, however, has the disadvantage tht due to the radial overlap of the shaft collar and the bearing ring, it cannot be axially displaced on axial overloading caused by impact effects for example and this can lead to a destruction of the bearing with other damages possibly resulting therefrom.

OBJECTS OF THE INVENTION

It is an object of the invention to provide a tolerance ring in a simple way so that a destruction of the rolling bearing on axial overloading is avoided.

This and other objects and advantages of the invention will become obvious from the following detailed description.

THE INVENTION

The novel polymeric tolerance ring of the invention arranged between a radial rolling bearing and a seating on a shaft or in the bore of a housing, wherein the tolerance ring bears against a radially directed surface of the seating on the shaft or housing bore in at least one axial direction and comprises a radially directed surface against which a bearing ring of the rolling bearing bears in the same axial direction with an end face, is characterized in that the radially directed surface of the seating and the end face of the bearing ring do not overlap radially.

By the radially directed surface of the seating and the end face of the bearing ring not overlapping radially, the advantage is obtained that on axial overloading, the radially directed surface of the tolerance ring against which the end face of the bearing ring bears, shears off and the rolling bearing is pushed away axially from the tolerance ring without being destroyed.

In an advantageous development of the invention, the radially directed surface is formed by a collar against which a radial rim of the tolerence ring bears. The rim is dimensioned so that it corresponds to the required retaining force and shears off on axial overloading. In a further development of the invention, it is also possible that the radially directed surface of the seating be formed by an annular groove into which at least one projection of the tolerance ring engages. This design has the advantage that the shaft does not need to be provided with a shoulder over a long distance and that the collar as well as the projection engaging into the annular groove can be dimensioned so that they shear off on axial overloading. In the latter case, it is appropriate to provide the tolerance ring with a peripheral collar.

In a further variant of the invention, the tolerance ring is split in the longitudinal direction of the bearing or made up of two parts which substantially facilitates the mounting of the tolerance ring.

Figure 2:
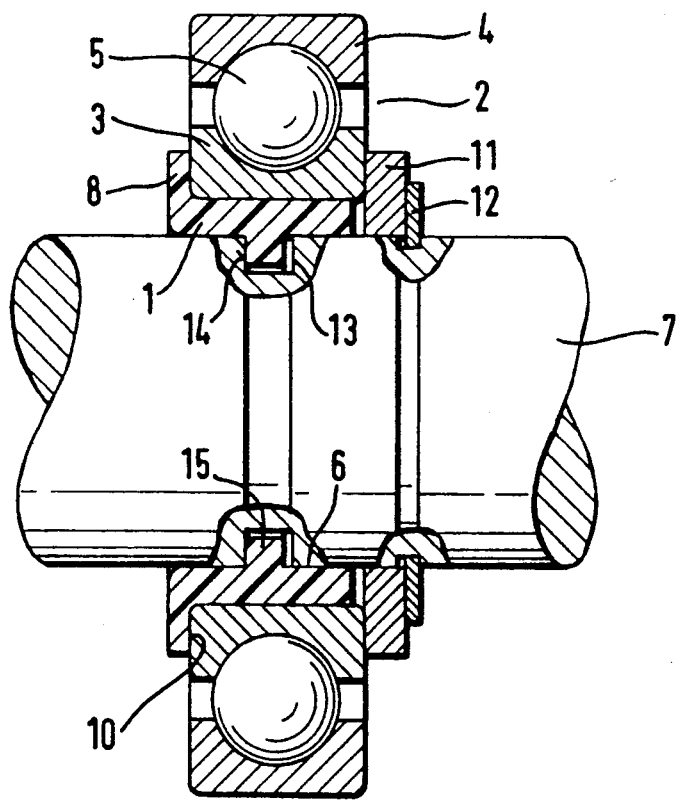

Referring now to the drawings:

FIGS. 1 and 2 illustrate two examples of an embodiment of the invention represented in longitudinal cross-section.

In FIG. 1, a tolerance ring 1 made of polymeric material is arranged between a rolling bearing 2 consisting of an inner ring 3, an outer ring 4 and rolling elements 5, and a seating 6 on a shaft 7. According to FIG. 1, the tolerance ring 1 bears in one axial direction with its end face formed by a radial rim 8 against a collar 9 of the shaft 7. In the same axial direction, the inner ring 3 bears with its end face 10 against the rim 8 of the tolerance ring 1. In the other axial direction, the rolling bearing 2 is fixed with respect to the shaft 7 with the help of a disk 11 and a spring ring 12. As can be seen from FIG. 1, the collar 9 of the shaft 7 and the end face 10 of the inner ring 3 are situated opposite each other without overlap in the radial direction.

FIG. 2 differs from the embodiment of FIG. 1 only in that instead of the collar 9, an annular groove 13 is provided which has a radially directed surface 14 against which a projection 15 of the tolerance ring 1 bears.

Various modifications of the tolerance ring of the invention may be made without departing from the spirit or scope thereof and it should be understood that the invention is intended to be limited only as defined in the appended claims.

What we claim is:

1. A tolerance ring (1) made of polymeric material arranged between a radial rolling bearing (2) and a seating (6) on a shaft (7) or in the bore of a housing, wherein the tolerance ring (1) bears against a radially directed surface (14) of the seating (6) on the shaft or in the housing bore in at least one axial direction and comprises a rim (8) against a radially directed surface of which, a bearing ring (3) of the rolling bearing (2) bears in the same axial direction with an end face (10), the radially directed surface (14) of the seating (6) and the end face (10) of the bearing ring (3) not overlapping each other radially, characterized in that the radially directed surface (14) of the seating (6) is formed by an annular groove (13) into which at least one projection (15) of the tolerance ring (1) engages.

2. A radial rolling bearing of claim 1 wherein the tolerance ring (1) is split in the longitudinal direction.

3. A radial rolling bearing a claim 1 wherein the tolerance ring (1) is made up of two parts.

* * * * *